(12) United States Patent
Gokemeijer

(10) Patent No.: US 7,996,986 B2
(45) Date of Patent: Aug. 16, 2011

(54) APPARATUS FOR FORMING MAGNETIC RECORDING HEADS

(75) Inventor: Nils Jan Gokemeijer, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 309 days.

(21) Appl. No.: 12/370,976

(22) Filed: Feb. 13, 2009

(65) Prior Publication Data

US 2010/0208391 A1    Aug. 19, 2010

(51) Int. Cl.
*B23P 19/00* (2006.01)
*G11C 5/12* (2006.01)
*H01M 2/04* (2006.01)

(52) U.S. Cl. .............. 29/737; 29/603.07; 29/603.13; 29/603.14; 29/603.15; 29/603.18; 451/5; 451/8; 451/10; 451/36; 451/37

(58) Field of Classification Search .............. 29/603.12, 29/603.13–603.16, 603.18, 603.23, 737; 451/5, 8, 10, 36, 37, 41

See application file for complete search history.

(56) References Cited

U.S. PATENT DOCUMENTS

| | | | |
|---|---|---|---|
| 4,841,625 A | 6/1989 | Valstyn | |
| 5,056,353 A * | 10/1991 | Matono | 73/7 |
| 5,305,559 A * | 4/1994 | Ogawa | 451/54 |
| 5,579,717 A | 12/1996 | Crandell et al. | |
| 6,003,361 A | 12/1999 | Amin et al. | |
| 6,347,983 B1 | 2/2002 | Hao et al. | |
| 6,884,148 B1 | 4/2005 | Dovek et al. | |
| 6,935,923 B2 | 8/2005 | Burbank et al. | |
| 7,610,673 B2 * | 11/2009 | Takahashi | 29/603.07 |
| 7,861,400 B2 * | 1/2011 | Lille | 29/603.09 |
| 2008/0141522 A1 | 6/2008 | Baer et al. | |

* cited by examiner

*Primary Examiner* — Paul D Kim

(74) *Attorney, Agent, or Firm* — Jennifer M. Buenzow

(57) ABSTRACT

An apparatus includes: a first layer having a near field transducer positioned in a waveguide cladding; a second layer having a magnetic pole piece; a third layer including a solid immersion mirror; a first lapping guide positioned in the first layer; a second lapping guide positioned in the second layer; and a third lapping guide positioned in the third layer.

10 Claims, 4 Drawing Sheets

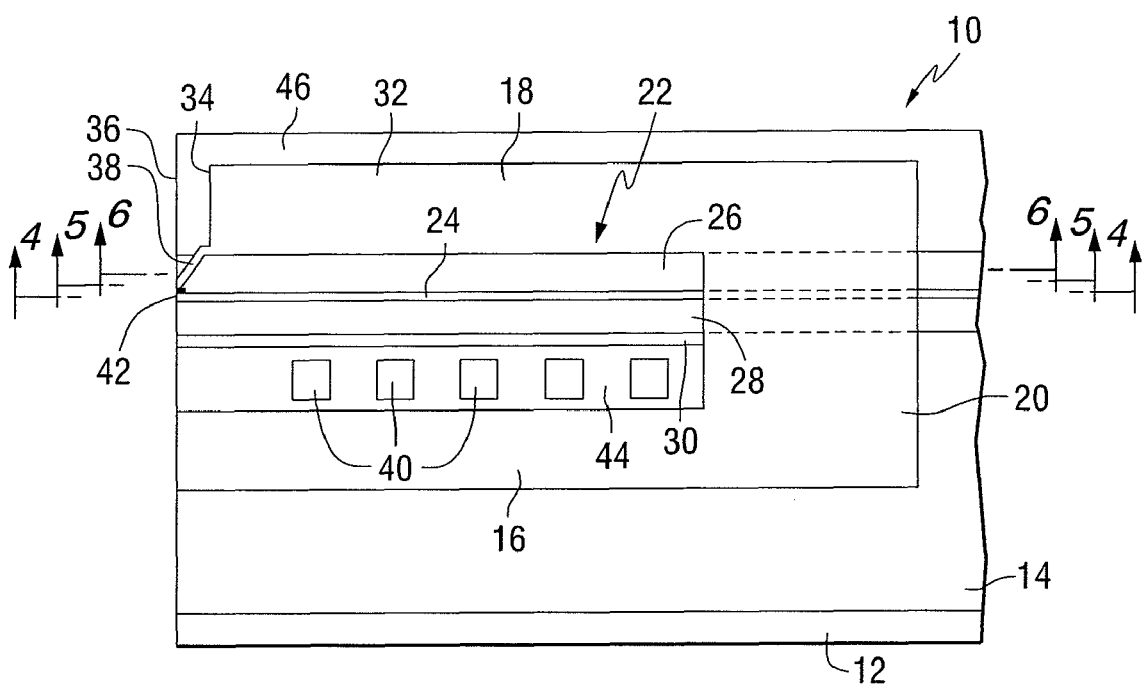
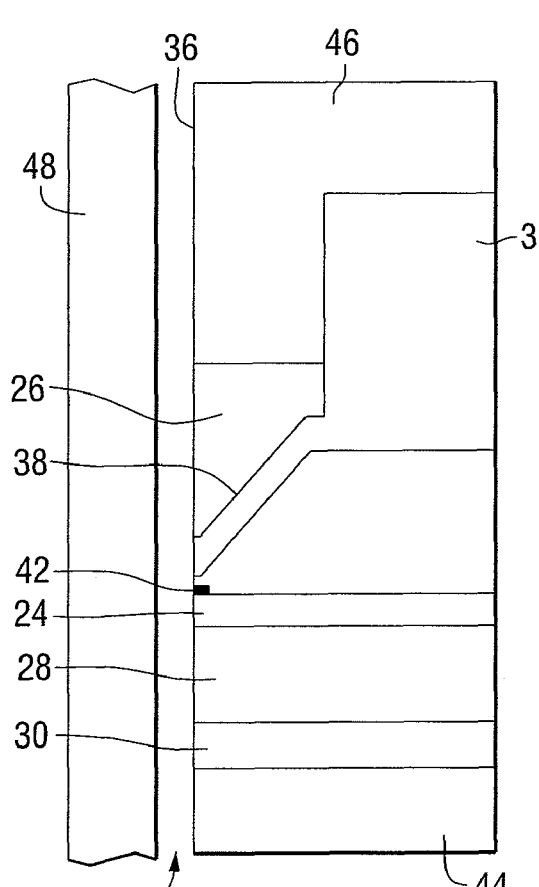 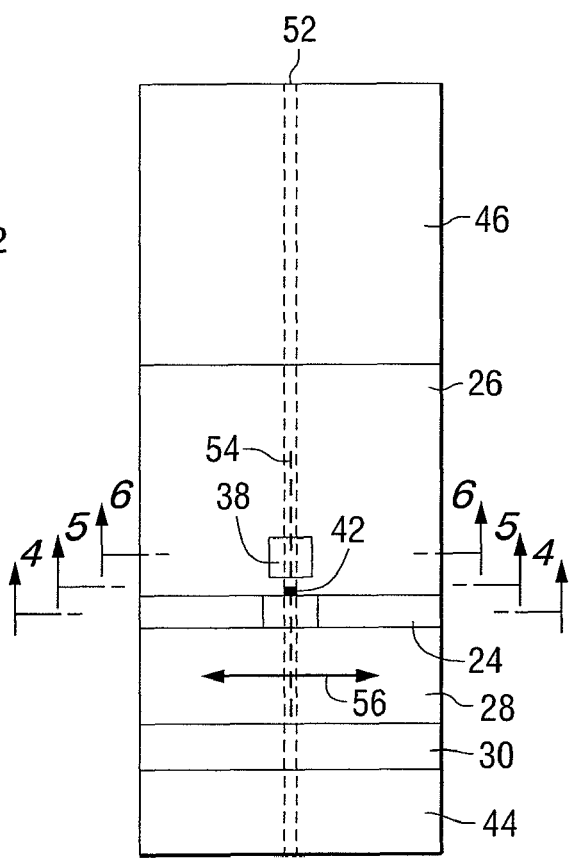
FIG. 1
FIG. 2
FIG. 3

APPARATUS FOR FORMING MAGNETIC RECORDING HEADS

BACKGROUND

During the fabrication of magnetic heads for use in magnetic data storage applications, a plurality of transducers and auxiliary circuits are typically fabricated on a common substrate. To establish adequate performance for high efficiency recording heads, it is desirable that features of the magnetic head, such as the height of a magnetoresistive element (MRE) sensor or a throat height of a write pole are controlled within a very tight tolerance.

Thin film deposition techniques are often used to fabricate magnetic read/write transducers. In a typical process, an array of transducers and electronic lapping guides (ELGs) are formed on a common substrate by a deposition of metallic and nonmetallic layers. The patterning of the array of transducers and ELGs can be accomplished using photolithography in combination with etching and lift-off processes. The finished array or wafer can be optically and electrically inspected and then sliced to produce bars, with one row of transducers in a side-by-side pattern on each bar. The bars are then lapped at the air bearing surface (ABS), which will eventually face the recording medium, to establish a specified sensor height.

During machining of a particular row of transducers and ELGs, the machined surface moves from a beginning position to a final position while reducing the height of the transducers. The primary function of the ELGs is to control the machining process such that the desired transducer height is achieved. After a particular row of transducers is machined to the desired transducer height as controlled by the ELGs, the rows or bars are cut or diced into individual recording heads or sliders.

Heat assisted magnetic recording (HAMR) generally refers to the concept of locally heating a recording medium to reduce the coercivity of the recording medium so that the applied magnetic writing field can more easily direct the magnetization of the recording medium during the temporary magnetic softening of the recording medium caused by the heat source. For heat assisted magnetic recording (HAMR) a tightly confined, high power laser light spot is used to preheat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells.

Although the electronic lapping guides are useful to lap recording heads to a target transducer height, there is no easy way to verify whether all the separate layers of a HAMR head are actually aligned both in a direction perpendicular to the ABS and in a cross-track direction. It would be desirable to determine the location of the elements in a HAMR recording head at the air bearing surface of the recording head.

SUMMARY

In a first aspect, the invention provides a method including: fabricating a wafer having a plurality of layers, each including a feature of interest and a lapping guide positioned at a known location relative to the feature of interest, wherein the feature of interest and the lapping guide cross a common plane; lapping the wafer to the common plane to expose portions of the lapping guides; and measuring dimensions of the lapping guides and an offset of the lapping guides with respect to each other.

In another aspect, the invention provides an apparatus including a first layer including a near field transducer positioned in a waveguide cladding adjacent to an air bearing surface, a second layer including a magnetic pole piece having an end positioned adjacent to the air bearing surface, a third layer including a solid immersion mirror, a first lapping guide positioned in the first layer at a known location relative to the near field transducer, a second lapping guide positioned in the second layer at a known location relative to the magnetic pole piece, and a third lapping guide positioned in the third layer at a known location relative to sidewalls of the solid immersion mirror.

BRIEF DESCRIPTION OF THE DRAWINGS

FIG. 1 is a cross-sectional view of a recording head for use in heat assisted magnetic recording.

FIG. 2 is an enlarged view of a portion of the recording head of FIG. 1.

FIG. 3 is an enlarged view of a portion of the air bearing surface of the recording head of FIG. 1.

DETAILED DESCRIPTION OF THE INVENTION

Figure 4:
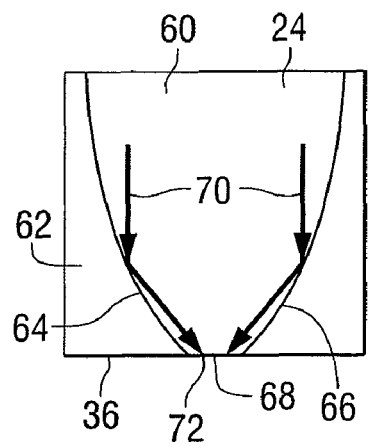
FIG. 4 is a cross-sectional view of the recording head of FIG. 1 taken along line 4-4.

In one aspect, this invention relates generally to the batch fabrication of heat assisted magnetic recording heads, which include an optical waveguide and a near field transducer for data storage applications. In one example, the invention relates to methods and apparatus for determining the relative alignment of elements of a recording head at an air bearing surface in a cross-track direction.

FIG. 1 is a cross-sectional view of a recording head for use in heat assisted magnetic recording. The recording head of FIG. 1 is an example of a recording head that can be constructed in accordance with an aspect of the invention. However, it should be understood that the invention is not limited to the particular structure shown in FIG. 1.

The recording head 10 includes a substrate 12, a base coat 14 on the substrate, a bottom pole 16 on the base coat, and a top pole 18 that is magnetically coupled to the bottom pole through a yoke or pedestal 20. A waveguide 22, in the form of a solid immersion mirror, is positioned between the top and bottom poles. The waveguide includes a core layer 24 and cladding layers 26 and 28 on opposite sides of the core layer.

A mirror 30 is positioned adjacent to one of the cladding layers. The top pole is a two-piece pole that includes a first portion, or pole body 32, having a first end 34 that is spaced from the air bearing surface 36, and a second portion, or sloped pole piece 38, extending from the first portion and tilted in a direction toward the bottom pole. The second portion is structured to include an end adjacent to the air bearing surface 36 of the recording head, with the end being closer to the waveguide than the first portion of the top pole. A planar coil 40 also extends between the top and bottom poles and around the pedestal. A near field transducer (NFT) 42 is positioned in the cladding layer 26 adjacent to the air bearing surface. An insulating material 44 separates the coil turns. Another layer of insulating material 46 is positioned adjacent to the top pole.

FIG. 2 is an enlarged view of a portion of the recording head of FIG. 1. When used in a data storage device, the recording head is positioned adjacent to a data storage media 48 and separated from the storage media by an air bearing 50. Light is coupled into the waveguide and directed toward the storage media to heat a portion of the storage media, thereby reducing the coercivity of the heated portion. The near field transducer serves to concentrate the light into a small spot on the storage media. A magnetic field from the write pole is used to set the direction of magnetization of the heated portion of the storage media.

FIG. 3 is an enlarged view of a portion of the air bearing surface of the recording head of FIG. 1. In operation, data is stored in tracks on the media. An approximate location of a data track is illustrated as item 52 in FIG. 3. It is important that the end of the solid immersion mirror, the near field transducer and the end of the write pole are aligned on a common line 54 in a direction parallel to the track direction. In one aspect, this invention provides a method and apparatus for detecting misalignment of the end of the waveguide, the near field transducer and the end of the write pole in a cross-track direction 56, as well as a direction perpendicular to the ABS.

FIG. 4 is a cross-sectional view of the recording head of FIG. 1 taken along line 4-4 in the core layer of the waveguide. In FIG. 4, the core layer 24 is shown to include two different materials 60 and 62, having different indexes of refraction. This structure forms a solid immersion mirror (SIM). Interfaces 64 and 66 having a generally parabolic shape are formed between the materials, such that light in the core layer is reflected toward a focal point 68 near the air bearing surface, as illustrated by arrows 70. The SIM has a substantially flat end 72 at the air bearing surface 36. In one example, the walls of material 60 are coated with gold to reflect the light.

Figure 5:
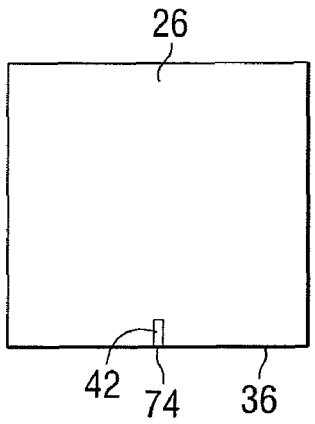
FIG. 5 is a cross-sectional view of the recording head of FIG. 1 taken along line 5-5.

FIG. 5 is a cross-sectional view of the recording head of FIG. 1 taken along line 5-5. In FIG. 5, the near field transducer 42 is shown to be embedded in the cladding layer 26. An end 74 of the near field transducer 42 is positioned adjacent to the air bearing surface 36.

Figure 6:
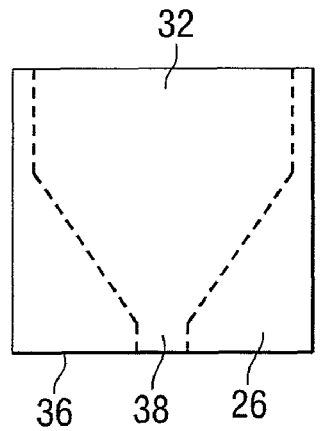
FIG. 6 is a cross-sectional view of the recording head of FIG. 1 taken along line 6-6.

FIG. 6 is a cross-sectional view of the recording head of FIG. 1 taken along line 6-6. In FIG. 6, the pole piece 38 is shown to be tapered such that its cross-sectional area decreases as it approaches the air bearing surface 36.

It is possible to measure overlay on each individual slider after lapping by depositing triangular lapping guides at the air bearing surface (ABS) at the layers of interest. For example to make sure the write pole is well aligned to the ABS, two triangles can be deposited or etched during fabrication of the write pole. For triangular lapping guides where the height into the ABS is half the width of the base, the offset with respect to the ABS is then the difference between the two widths divided by four.

Thin film deposition techniques can be used to fabricate a plurality of layers on a wafer that is further processed to form an array of recording heads, such as the recording head of FIG. 1. The patterning can be accomplished using photolithography in combination with etching and lift-off processes. The finished array can be optically inspected and then sliced to produce bars, with one row of recording heads in a side-by-side pattern on each bar. The bars are then lapped at the air bearing surface (ABS) to establish a specified sensor height.

During machining of a particular row of recording heads, the machined surface moves from a beginning position to a final position while reducing the height of the transducers. After a particular row of transducers is machined to the desired transducer height, the rows or bars are cut or diced into individual recording heads or sliders.

Figure 7:
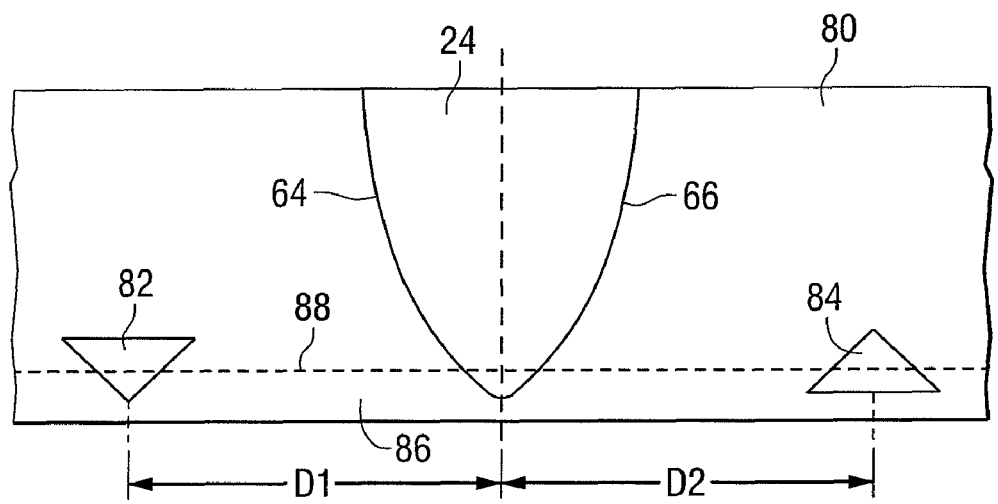
FIG. 7 is a cross-sectional view of a portion of a layer in a wafer that can be used in the fabrication of the recording head of FIG. 1.

FIG. 7 is a cross-sectional view of a wafer layer 80 that can be used to form the core 24 of the waveguide in the recording head of FIG. 1. In FIG. 7, the core layer 24 is shown to include sides 64 and 66 having a generally parabolic shape. Triangular lapping guides 82 and 84 are deposited or etched into layer 80 during the fabrication process. Using a lapping process, the lower portion 86 of the wafer layer 80 is removed up to a plane 88, which will form the air bearing surface of the recording head.

The relative location on the wafer of the waveguide sides 64, 66, and the sides of the lapping guides (i.e., the triangles) are tightly controlled during fabrication. Thus the absolute positions of the lapping guides and the feature of interest in the same layer as the lapping guides are strongly correlated.

The layer 70 can be made of, for example, AlO, TaO, MgO, etc. The core 24 and insulating material 80 are oxides, and a metal material (e.g., gold, aluminum, silver, or another alloy) is deposited on the sides 66, 64 of the solid immersion mirror and the sides of the lapping guides (i.e., the triangles), resulting in a very high contrast when viewed with a scanning electron microscope from the air bearing surface (ABS).

Figure 8:
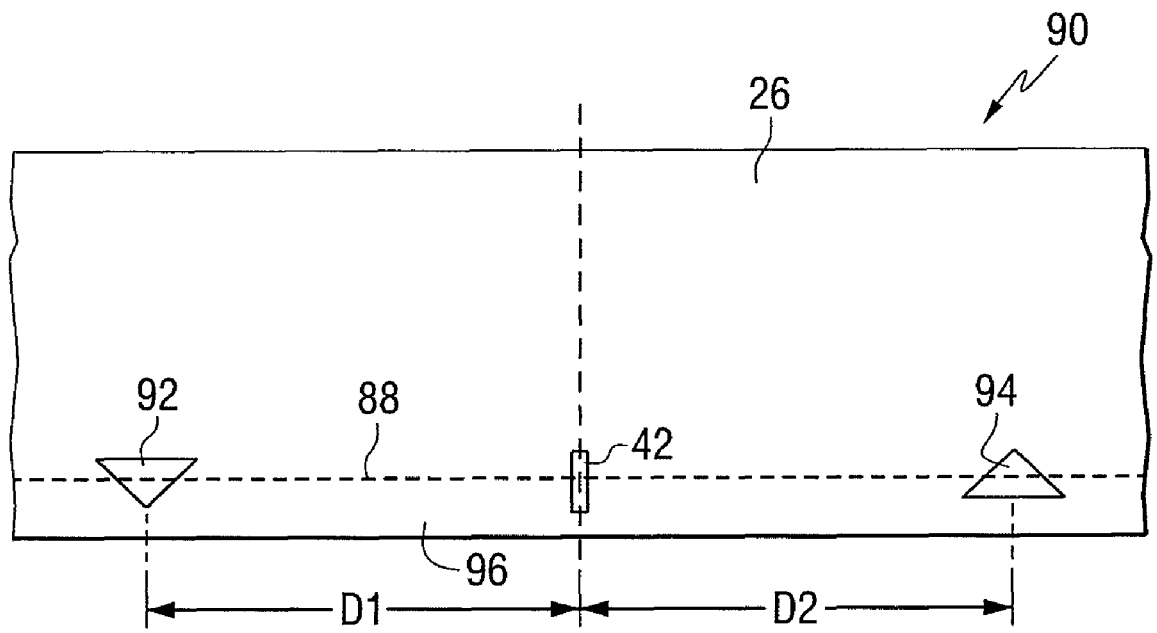
FIG. 8 is a cross-sectional view of a portion of another layer in a wafer that can be used in the fabrication of the recording head of FIG. 1.

FIG. 8 is a cross-sectional view of a wafer layer 90 that can be used to form the cladding layer 26 of the waveguide in the recording head of FIG. 1. In FIG. 8, a near field transducer 42 is shown to be embedded in the cladding layer 26. Triangular lapping guides 92 and 94 are deposited or etched into layer 90 during the fabrication process. The relative positions of the transducer and the lapping guides are tightly controlled during fabrication. The absolute positions of the transducer and the lapping guides are therefore strongly correlated.

Using a lapping process, the lower portion 96 of the wafer layer 90 is removed up to the plane 88, which will form the air bearing surface of the recording head. The layer 90 can be made of, for example, AlO or any other transparent material, and the triangles can be made of, for example, gold, silver or other plasmonic material.

Figure 9:
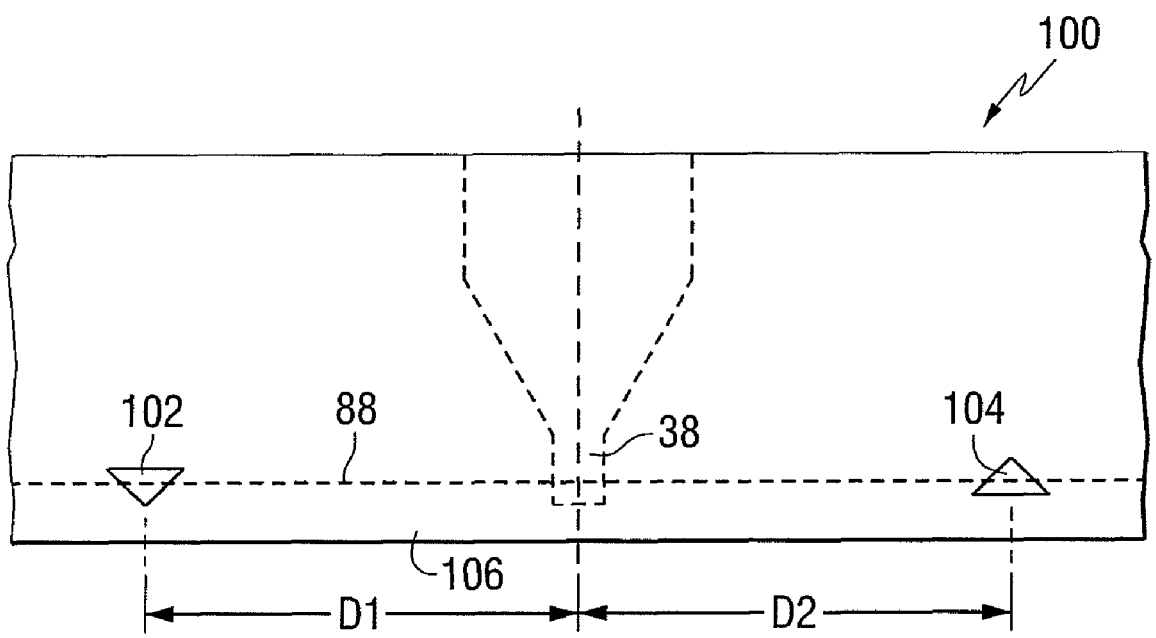
FIG. 9 is a cross-sectional view of a portion of another layer in a wafer that can be used in the fabrication of the recording head of FIG. 1.

FIG. 9 is a cross-sectional view of a wafer layer 100 that can be used to form the top pole 18 of the recording head of FIG. 1. Triangular lapping guides 102 and 104 are deposited or etched into layer 100 during the fabrication process. The relative positions of the pole and the lapping guides are tightly controlled during fabrication. The absolute positions are therefore strongly correlated. Using a lapping process, the lower portion 106 of the wafer layer 100 is removed up to the plane 88, which will form the air bearing surface of the recording head. In FIG. 9, the pole piece is shown to be tapered such that its cross-sectional area decreases as it approaches the air bearing surface.

The layer 100 can be made of, for example, AlO or any other transparent insulating material, and the triangle lapping guides and the pole can be made of, for example, CoFe or any other high moment magnetic material.

For the cross-track alignment, the lapping guides need not have a triangular shape. In addition, only one lapping guide is needed in each layer having a feature of interest. However, it is desirable to use lapping guides that are all centered over each other in the layers having features of interest. While any shape lapping guides can be used for cross-track alignment, if the lapping guides are also used to determine throat height (i.e., the length of a pole portion near the ABS), then a triangular shape works well. In addition, using one triangle inverted with respect to the other in the same layer assists in the determining throat height.

In an alternative embodiment, the lapping guides could be outlines of the triangles, or outlines of other shapes. Alternatively, the lapping guides could be thin features that are spaced apart in the plane of the layer, such as thin features positioned along the left and right sides of the triangles illustrated in the drawings. By using lapping guides of different sizes in the different layers, the lapping guides can be distinguished from each other at the ABS for image recognition.

The SIM sidewall needs to reflect all the light in the core layer, so the SIM etch is done last, and etches through all the other layers down to the mirror. The reflecting metal is then deposited on the sidewalls of the SIM, creating the goal-post like structure 106 shown in FIGS. 10 and 11. Since the SIM etch is performed last in the wafer fabrication process, and etched through the pole layer, the transducer layer, the core layer, and the bottom cladding layer, the SIM lapping guides should be the largest so as not to etch away the other triangles.

Aligning the lapping guides along a common line perpendicular to the planes of the layers allows for easy diagnostic alignment measurement. In the example of FIGS. 7-9, the common lines could be positioned at distances D1 and D2 from the center of the recording head. The relative positions of the lapping guides provide offset information. For example, if the center of the near field transducer lapping guide is 20 nm to the left of the center of the SIM lapping guide, that probably means that there is an offset problem in the fabrication process.

Figure 10:
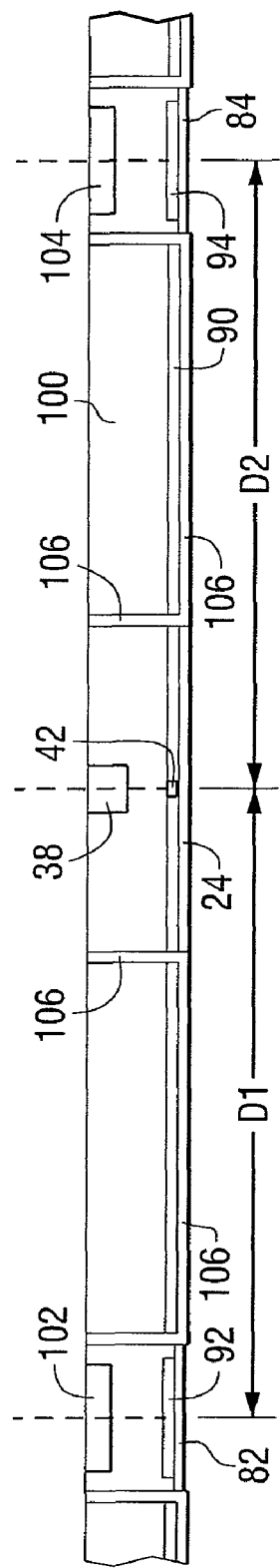
FIG. 10 is a plan view of an air bearing surface formed by lapping the layers of FIGS. 7-9.

FIG. 10 is a plan view of an air bearing surface 36 formed by lapping the layers of FIGS. 7-9 up to the plane 88. The cross-sectional views of the triangular lapping guides 82, 84, 92, 94, 102 and 104 at the lapping plane are shown to have rectangular shapes. The SIM etch is done last, and then a thin layer of Au, Ag, or other metal is deposited creating the substantially vertical line 106. Ideally the lines would be exactly perpendicular to the planes of the layers. This metal is the SIM sidewall that reflects the light in the SIM.

Figure 11:
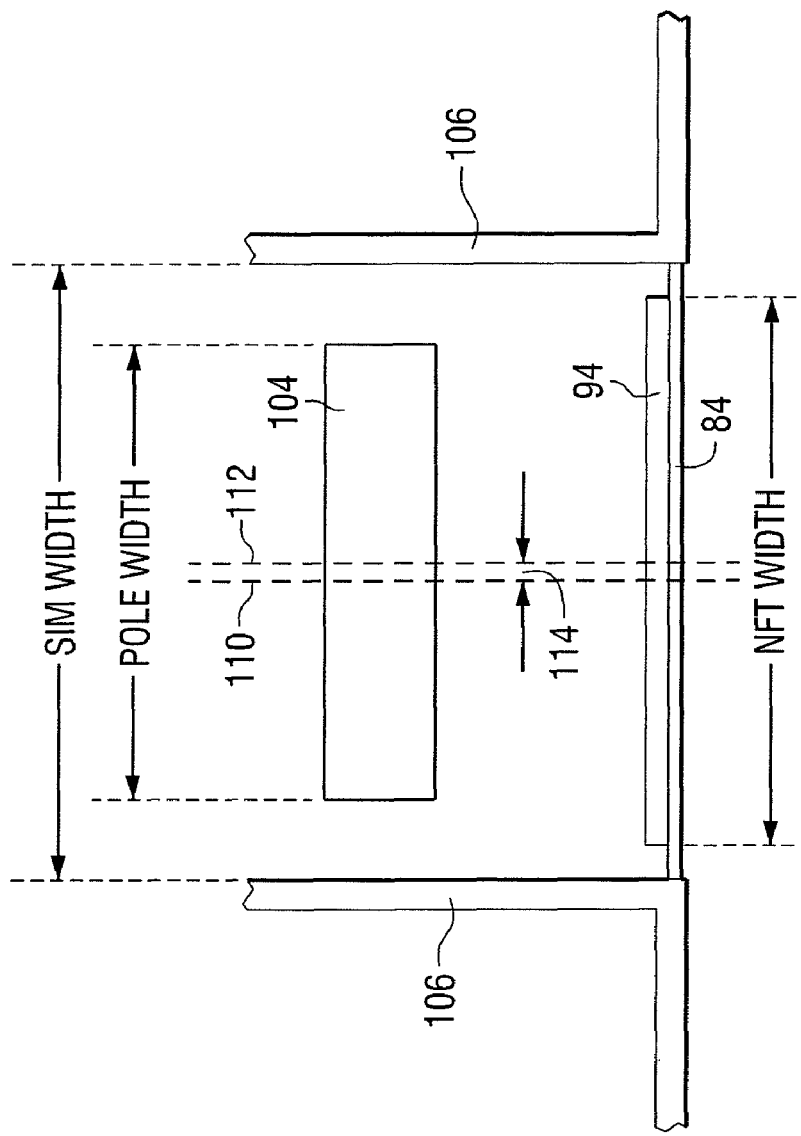
FIG. 11 is an enlarged plan view of one set of lapping guides from FIG. 10 at the air bearing surface formed by lapping the layers of FIGS. 7-9.

FIG. 11 is an enlarged view of one set of lapping guides of the structure of FIG. 10. Ideally, lapping guides 84, 94 and 104 would be centered on line 110, which is oriented perpendicular to the planes of the layers. Since the lapping guides are positioned at a known, tightly controlled distance from the features of interest in the layers, the alignment of the lapping guides corresponds to alignment of the features of interest.

Imaging analysis of the lapping guides can be used to measure cross-track alignment of features in different layers and to measure the cross-track offset of such features with respect to each other. Previously it would have been very hard to ascertain whether the NFT, which can be, for example, 50 nm wide, is aligned with the center of the solid immersion mirror (SIM), which can have a truncated end that is for example 6 micron wide. However, with lapping guides in the NFT and SIM layers deposited at the ABS, the offset of each layer with respect to the ABS can be measured, and the cross-track offset of NFT to the center of the SIM can be measured.

Imaging analysis of the offset can be implemented using a Critical Dimension Scanning Electron Microscope (CD-SEM) and automated image analysis. Scanning of the beam across the exposed air bearing surface and subsequent collection of the reflected electrons enables measurement of the feature size. In one example, the SIM Width1, SIM Width2, NFT Width1, NFT Width2 and the offset are measured.

A commercial CDSEM, such as from KLA-Tencor or FEI, can be used to image the set of lapping guides at a sufficiently high resolution, resulting in (for example) a 2 micron field of view with 4.16 nm pixels for each set of lapping guides. Commercially available automated image analysis software, such as from National Instruments or from FEI can be used to measure the width of each lapping guide, and offsets between the lapping guides with respect to each other in a direction parallel to the planes of the layers (i.e., in the cross-track direction). For perfectly aligned layers, all offsets measure 0 nm, which indicates perfect cross-track alignment, and all widths measure the same, i.e., NFT Width1=NFT Width2, SIM Width1=SIM Width 2, Pole Width1=Pole Width2, indicating perfect alignment in a direction perpendicular to the ABS. Misalignments as small as 4.16 nm can be measured.

If the lapping guides are designed to be triangles where the height into the ABS is half the width of the base, the misalignment in a direction perpendicular to the ABS of the NFT is (NFT Width1−NFT Width2)/4 and misalignment of the SIM is (SIM Width1−SIM Width2)/4.

The cross-track misalignment of the features of interest is equal to the measured offset of the corresponding lapping guides.

In one aspect, the invention provides a method including the steps of fabricating a wafer having a plurality of layers, each including a feature of interest and a lapping guide structure positioned at a known location relative to the feature of interest, wherein the feature of interest and the lapping guide structure cross a common plane, and the features of interest in the plurality of layers are substantially aligned on a common line, lapping the wafer to the common plane to expose portions of the lapping guides, and measuring an offset of the lapping guides with respect to each other. Referring to FIG. 10, the features of interest are the truncated end of the SIM core layer, the near field transducer, and the end of the write pole.

While the invention has been described in terms of several examples, it will be apparent to those skilled in the art that various changes can be made to the disclosed examples without departing from the scope of the invention as defined by the following claims. The implementations described above and other implementations are within the scope of the claims.

What is claimed is:

1. An apparatus comprising:
   a first layer including a near field transducer positioned in a waveguide cladding adjacent to an air bearing surface;
   a second layer including a magnetic pole piece having an end positioned adjacent to the air bearing surface;
   a third layer including a solid immersion mirror;
   a first lapping guide positioned in the first layer at a known location relative to the near field transducer;
   a second lapping guide positioned in the second layer at a known location relative to the magnetic pole piece; and
   a third lapping guide positioned in the third layer at a known location relative to sidewalls of the solid immersion mirror.

2. The apparatus of claim 1, wherein the first, second, and third lapping guides are centered along a common line in a direction perpendicular to the planes of the layers.

3. The apparatus of claim 1, wherein each of the first, second and third lapping guides has a triangular shape.

4. The apparatus of claim 3, wherein the third lapping guide is larger than each of the first and second lapping guides.

5. The apparatus of claim 1, wherein the lapping guides are coated with a high contrast material.

6. The apparatus of claim 5, wherein the high contrast material comprises gold.

7. The apparatus of claim 1, wherein the lapping guides comprise a plasmonic material.

8. The apparatus of claim 1, wherein the first lapping guide is deposited onto the first layer, the second lapping guide is deposited onto the second layer, and the third lapping guide is deposited onto the third layer.

9. The apparatus of claim 1, wherein the first lapping guide is etched onto the first layer, the second lapping guide is etched onto the second layer, and the third lapping guide is etched onto the third layer.

10. The apparatus of claim 1, wherein at least one of the first, second, or third layers includes at least two triangular-shaped lapping guides, wherein one of the triangular-shaped lapping guides is inverted with respect to the other triangular-shaped lapping guide.

* * * * *